(12) United States Patent
Inselberg

(10) Patent No.: US 7,263,378 B2
(45) Date of Patent: *Aug. 28, 2007

(54) METHOD AND APPARATUS FOR INTERACTIVE AUDIENCE PARTICIPATION AT A LIVE ENTERTAINMENT EVENT

(76) Inventor: Eric Inselberg, P.O. Box 833, Short Hills, NJ (US) 07078

( * ) Notice: Subject to any disclaimer, the term of this patent is extended or adjusted under 35 U.S.C. 154(b) by 0 days.

This patent is subject to a terminal disclaimer.

(21) Appl. No.: 11/347,993

(22) Filed: Feb. 6, 2006

(65) Prior Publication Data

US 2006/0154657 A1    Jul. 13, 2006

Related U.S. Application Data

(63) Continuation-in-part of application No. 11/300,208, filed on Dec. 14, 2005, which is a continuation-in-part of application No. 10/792,170, filed on Mar. 3, 2004, now Pat. No. 6,996,413, which is a continuation-in-part of application No. 10/378,582, filed on Mar. 5, 2003, now Pat. No. 6,760,595, which is a continuation-in-part of application No. 09/854,267, filed on May 11, 2001, now Pat. No. 6,650,903, which is a continuation of application No. 09/656,096, filed on Sep. 6, 2000, now Pat. No. 6,434,398.

(51) Int. Cl.
*H04Q 7/20* (2006.01)

(52) U.S. Cl. ............ 455/517; 455/575.6; 463/40

(58) Field of Classification Search ........... 455/66.1, 455/90.3, 575.6, 517, 550, 414.1, 414.2, 455/414.3; 463/36–42; 725/9; 705/27, 705/37, 3
See application file for complete search history.

(56) References Cited

U.S. PATENT DOCUMENTS

| 4,141,548 | A | 2/1979 | Everton ............... 273/1 E |
|---|---|---|---|
| 4,496,148 | A | 1/1985 | Morstain et al. ...... 273/1 E |
| 4,722,526 | A | 2/1988 | Tovar et al. ........... 273/1 E |
| 5,213,337 | A | 5/1993 | Sherman ............... 273/439 |
| 5,226,177 | A | 7/1993 | Nickerson ............... 455/2 |
| 5,273,437 | A | 12/1993 | Caldwell et al. ...... 434/351 |
| 5,526,035 | A | 6/1996 | Lappington et al. ... 348/13 |
| RE35,449 | E | 2/1997 | Derks ................... 395/800 |
| 5,724,357 | A | 3/1998 | Derks ................... 370/413 |
| 5,801,754 | A | 9/1998 | Rybal et al. ............ 348/13 |
| 5,860,862 | A | 1/1999 | Junkin ................... 463/40 |

(Continued)

OTHER PUBLICATIONS

Graig A. Krueger et al., Wireless Distributed Certified Real Time Bidding and Tracking System for Live Auctions, Aug. 3, 2000.*

(Continued)

*Primary Examiner*—Jean Gelin
(74) *Attorney, Agent, or Firm*—Ernest D. Buff & Associates LLC; Ernest D. Buff; Theodore J. Pierson

(57) ABSTRACT

A method and system provide interactive participation during shopping activity occurring at a shopping venue. Enjoyment for a plurality of enrolled participants is enhanced. Participants employ wireless interactive devices that present a promotional message and include user input and output interfaces. Participants are queried, and enter answers via the user input interface. The promotional messages are preferably related to businesses associated with the shopping venue.

54 Claims, 3 Drawing Sheets

U.S. PATENT DOCUMENTS

| | | |
|---|---|---|
| 5,916,024 A | 6/1999 | Von Kohorn ................. 463/40 |
| 5,946,635 A | 8/1999 | Dominguez ................. 455/558 |
| 5,993,314 A | 11/1999 | Dannenberg et al. .......... 463/1 |
| 6,080,063 A | 6/2000 | Khosta ........................ 463/42 |
| 6,193,610 B1 | 2/2001 | Junkin ......................... 463/40 |
| 6,293,868 B1 | 9/2001 | Bernard ....................... 463/42 |
| 6,434,398 B1 | 8/2002 | Inselberg ................... 455/517 |
| 2002/0029381 A1 | 3/2002 | Inselberg ....................... 725/9 |
| 2002/0115454 A1 | 8/2002 | Hardacker ................. 455/457 |
| 2002/0119823 A1 | 8/2002 | Beuscher ..................... 463/42 |
| 2002/0199198 A1 | 12/2002 | Stonedahl ................... 725/86 |

OTHER PUBLICATIONS http://www.meridia-interactive.com: Meridia Audience Response Systems http://www.replysystems.com: Wireless Audience Respone and Voting Systems.

http://www.presentationtesting.com: Presentation Testing, Inc.

\* cited by examiner

METHOD AND APPARATUS FOR INTERACTIVE AUDIENCE PARTICIPATION AT A LIVE ENTERTAINMENT EVENT

RELATED U.S. APPLICATION DATA

This application is a continuation-in-part of co-pending U.S. patent application Ser. No. 11/300,208, filed Dec. 14, 2005, which, in turn, is a continuation-in-part of U.S. patent application Ser. No. 10/792,170, filed Mar. 3, 2004 now U.S. Pat. No. 6,996,413, which, in turn, is a continuation-in-part of U.S. patent application Ser. No. 10/378,582, filed Mar. 5, 2003, now U.S. Pat. No. 6,760,595, issued Jul. 6, 2004, which, in turn, is a continuation-in-part of U.S. patent application Ser. No. 09/854,267, filed May 11, 2001, now U.S. Pat. No. 6,650,903, issued Aug. 18, 2003, which, in turn, is a continuation of U.S. patent application Ser. No. 09/656,096, filed Sep. 6, 2000, now U.S. Pat. No. 6,434,398, issued Aug. 13, 2002. Each of application Ser. Nos. 11/300, 208, 10/792,170, 10/378,582, 09/854,267, and 09/656,096 is incorporated herein in the entirety by reference thereto.

BACKGROUND OF THE INVENTION

1. Field of the Invention

The present invention relates to a system and method for interactive participation during shopping activity; and more particularly, to a system and method by which patrons at a shopping venue become enrolled and are afforded various opportunities to receive promotions and answer queries using wireless interactive devices, thereby enhancing the shopping experience and enjoyment.

2. Description of the Prior Art

Spectator events and, in particular, spectator sporting events have become a multibillion dollar a year business throughout the world. Millions of people attend their favorite sporting events, choosing among baseball, soccer, basketball, hockey, football, tennis, golf, auto racing, horse racing, boxing, and many others. Rather than merely watching sporting events on television, fans are willing to pay for the privilege of attending such events live in order to enjoy the spontaneity and excitement.

Audience reaction at live entertainment events is generally gauged informally on crowd volume. At certain events, limited amounts of information are shared with audience members using large screen displays such as those available from Sony Corporation under the trademark JUMBOTRON®. However, the opportunities for audience participation and useful or meaningful audience feedback are limited.

Marketing research has shown that audience members desire both an opportunity to participate in the spectator event and enjoy interactivity with other audience members. Informed audience members desire an opportunity to share their opinions with others. Heretofore, there has been no practical means to solicit the aggregate positions and the opinions of audience members at large venues (e.g., stadiums, arenas, race tracks, golf courses, theme parks, and other expansive outdoor/indoor venues).

Fans at live entertainment events have come to expect background information and detailed analysis from viewing televised sporting events at home and/or readily obtaining such information over the Internet. Further, audience members are becoming more and more accustomed to interactivity from their use of computer games, such as fantasy sports league games, that allow them to organize teams, determine game strategies and test their skill at managing a sports team. Accordingly, in order to continue attracting live audiences to attend these large venues, promoters have an incentive to provide audience members with an enhanced experience.

One example of a venue that would benefit from enhanced audience participation is major league baseball. The games last several hours, and audience members ordinarily spend most of their time in and around a reserved seat. When going to the concession stand or restrooms, the fan misses part of the game. Further, opportunities for interaction and expressing one's opinion are typically limited to cheering or jeering. Occasionally, a single fan or a few fans are selected to participate in a contest, such as a trivia contest, but these opportunities are extremely limited. Nearly every fan has an opinion about how the game should be played, and would like an opportunity to express his or her opinion. Ideally, fans would like to be recognized for their skill and knowledge concerning individual teams and/or winning strategies. Fans also desire to express opinions concerning facilities, sponsors, players, management and concessions. Being able to voice an opinion, and comparing the opinion to that of other fans, would enhance the overall experience. Also, this kind of information can be useful to management by helping it determine the kind of services that fans desire.

Additionally, an often-heard complaint from fans is that they missed some of the action because they could not see or did not know precisely what was happening. For example, any particular seat location affords its occupant only a single view of a playing field. In addition, some locations fail to offer an unobstructed view of the entire field. On other occasions a technical ruling made by a game official is not fully explained to those in attendance but is extensively analyzed by television and/or radio announcers, often with one or more instant replays of the event in question. Fans commonly resort to carrying conventional portable radio and TV receivers to games, whereby they obtain game commentary, instant replays, and the like to complement what they directly observe or obtain from the stadium's own announcers, scoreboards, and video displays.

It is also noted that spectators commuting to and/or from events do not have ready access to desirable information such as sports related information and other information such as traffic and weather reports.

The foregoing considerations apply to additional forms of entertainment that are associated with specific and defined programmatic content having an identifiable duration, such as the content provided by an athletic event, a musical or theatrical performance, or the like. Similar enhancements are also sought in connection with forms of entertainment that do not entail specific programmatic content. For example, persons patronize museums, casinos, shopping malls, theme parks, agricultural fairs or similar expositions, trade shows, conventions, or the like recognize entertainment value, whether or not such situations and activities include specific programmatic content having a generally defined duration as part or all of their experience.

Accordingly, there remains a need for a method and system that provides interaction that heightens the enjoyment experienced by participants in any of the aforementioned forms of entertainment.

SUMMARY OF THE INVENTION

The present invention relates to a method and apparatus for enhancing the experience of persons during shopping activity by providing interactivity. In a preferred embodiment of the invention, there is provided a method for enabling interactive participation by enrolled participants during shopping activity occurring at a shopping venue patronized by a plurality of persons. Each enrolled participant employs a wireless interactive device having a unique signature associated therewith and capability to: (i) receive and transmit messages; (ii) accept input via a user input interface, (iii) output messages to a user output interface; and (iv) transmit the unique signature. The method comprises the steps of: (i) enrolling at least some of the persons as enrolled participants, each being equipped with one of the wireless interactive devices; (ii) providing a wireless communication system adapted to transmit and receive messages with the interactive device; (iii) querying the enrolled participants to respond to at least one query with an answer entered through the user input interface and transmitted by the interactive device; and (iv) receiving answers entered by the enrolled participants. By having and using such a wireless interactive device, enrolled participants can receive promotional messages, which preferably provide announcements and solicitations that enhance the shopping experience. The interactive device is preferably a wireless, hand held device, having user input and output interfaces. The user input interface preferably comprises at least one member selected from the group consisting of a keypad, selection buttons, a touch screen, a rotatable dial, cursor keys, a pointing device (e.g. a mouse or trackball), and a voice recognition system. The user output interface preferably comprises a visible display for alphanumeric, textual, or graphic images and audio output means such as a speaker or earphone. Preferably the device is a cellular telephone, two-way pager, or wireless personal digital assistant (PDA) or pocket PC. It is further preferred that the device be Internet enabled, and that the wireless communication system employ the Internet in the bidirectional communication of data. Alternatively, the interactive device may be a special-purpose device incorporating at least the features needed for the practice of the present method. Communication protocols other than the Internet may alternatively be employed to provide the desired interactive communication. The device is easily transported, permitting the participant to carry and use it readily throughout attendance in the venue.

In an aspect of the invention, contests and polls may be conducted. Preferably these forms of querying are related to merchants operating in the shopping venue and to goods and services they provide. Using simple input devices, such as arrow keys and an enter key, a touch screen display or a numeric keypad, the participant selects from a list of promptings and/or possible answers. Prizes may be offered. The degree of attention and receptivity accorded to promotional messages and advertisements received by patrons using an interactive device during shopping activity in accordance with the present method is beneficially increased. The combination of the atmosphere of the shopping venue and the immediacy of the interactive content frequently heightens the degree of interest of participants for proffered advertisements over that accorded by those who receive advertising in more traditional forms.

Practice of the present method affords particular advantages for purveyors of services that are offered to individuals or small, predefined groups of persons either at appointed times or when service becomes available, such as restaurants, health clubs, hairstylists, and the like. More specifically, the method provides for dissemination of promotional messages that include: (i) a solicitation for enrolled persons to make a reservation for provision at a future time of a desired service; and (ii) a notification thereafter of the availability of the desired service. The solicitation may further include dissemination of a menu of available services, such as food and beverages, whereby an order can be entered and prepared for later delivery. Such arrangements are preferably made by exchange of text or other similar message forms.

Another aspect of the present invention provides a system for enabling interactive participation by enrolled participants during shopping activity occurring at a shopping venue patronized by a plurality of persons. Each enrolled participants employs a wireless interactive device having a unique signature associated therewith and capability to: (i) receive and transmit messages; (ii) accept input via a user input interface; (iii) output messages to a user output interface; and (iv) transmit the unique signature. The system comprises: (i) means for enrolling at least some of the persons as enrolled participants, each being equipped with one of the wireless interactive devices; (ii) a wireless communication means for transmitting and receiving messages with the interactive device; (iii) means for querying the enrolled participants to respond to at least one query with an answer entered through the user input interface and transmitted by the interactive device; and (iv) means for receiving answers entered by the enrolled participants. Preferably, the wireless communications system is provided by a cellular telephone network.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

For the purpose of illustrating the invention, there is shown in the accompanying drawings a form which is presently preferred; it being understood that the invention is not intended to be limited to the precise arrangements and instrumentalities shown.

DESCRIPTION OF THE PREFERRED EMBODIMENTS

Figure 1:
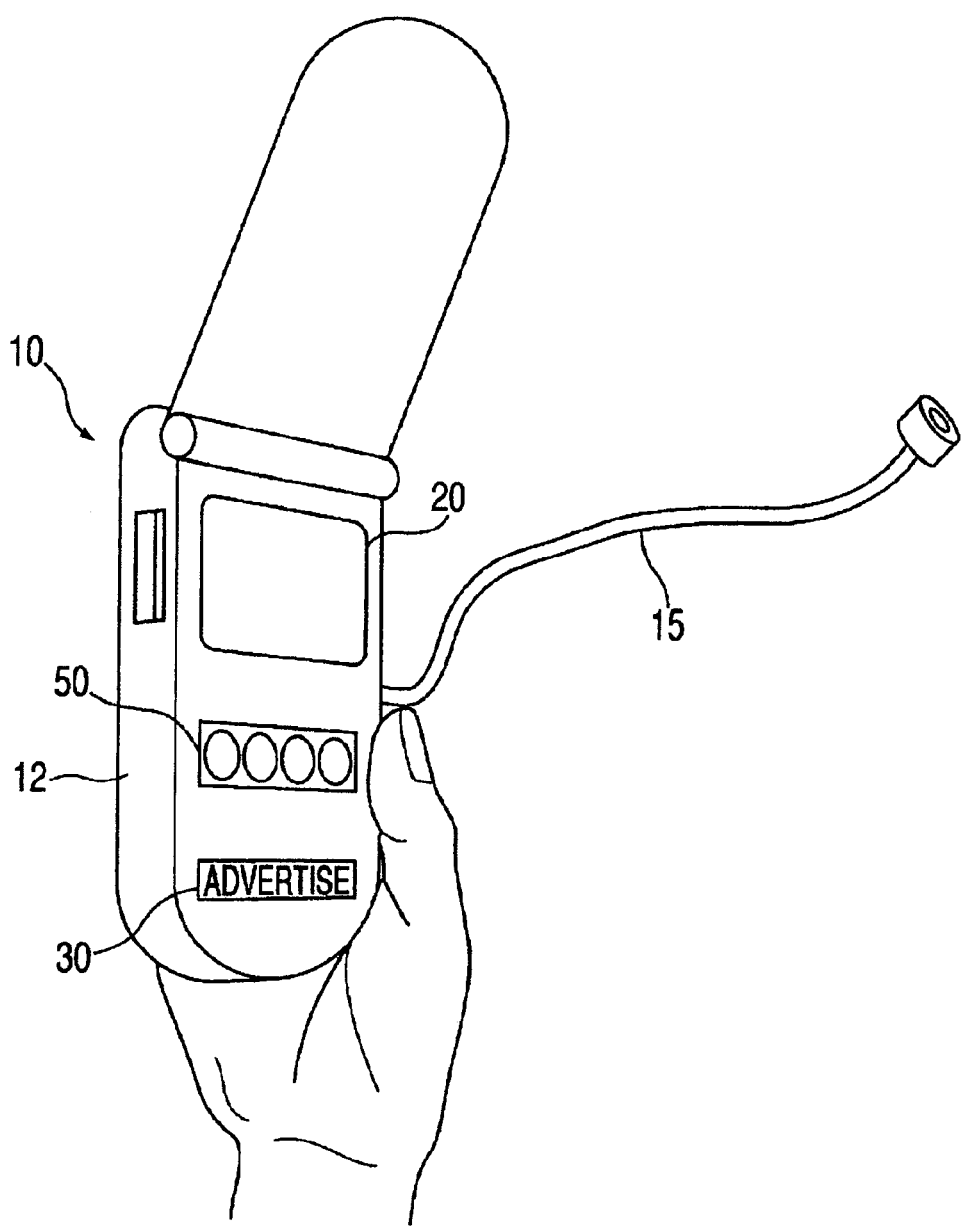
FIG. 1 is a perspective view of a hand held device used in connection with the interactive participation system of the present invention.

One representative embodiment of the present invention provides a method of enabling interactive participation at a live spectator event by a plurality of participants employing a wireless interactive device. The interactive participation enhances the enjoyment of such participants at a live event transpiring at any form of entertainment venue. Preferably, the method involves enrollment of persons desiring to partake of the features and benefits conveyed by participation.

Some forms of entertainment are associated with specific and defined programmatic content having an identifiable duration, such as the content provided by an athletic event, a musical or theatrical performance, or the like. On the other hand, entertainment may be provided to individuals as a consequence of patronizing a museum, casino, cruise ship, shopping mall, theme park, agricultural fair or similar exposition, a trade show, convention, or the like. Persons present on a college or university campus also experience such entertainment. The entertainment provided in such situations and activities may or may not include specific programmatic content having a generally defined duration as part or all of the activity. In some instances, the totality of entertainment activities has a duration bounded by opening and closing hours of a museum, mall, park, fairgrounds, convention hall, or the like. In other forms of entertainment, e.g. at casinos, activity often continues around the clock. It is to be understood that the present invention relates to entertainment forms either with or without the foregoing specific programmatic content and defined duration. For entertainment forms without defined duration, the present activity is bounded, with respect to any particular individual, by that individual's active or passive participation in any form of entertainment, instruction, promotion, or other conduct of the ordinarily associated with the particular type of venue.

For example, at a trade show, an attendee is normally provided with commercial or technical information or promotion of goods or services offered by exhibitors at the show. It is to be understood that dissemination of such information or promotion constitutes entertainment within the meaning of that term as used herein, and the duration of the event is understood to be defined generally by the attendee's presence at the venue. Similarly, a casino is often associated with a venue that includes a gaming area in which persons engage in any of a variety of games of chance or gambling, as well as other appurtenant areas providing restaurants, shops selling various forms of merchandise, theaters or auditoriums (e.g., providing live stage entertainment or activity), public gathering areas, and hotel accommodations.

The principles of the present system and method also find application in venues of yet other types. For example, shopping is perceived by many as being a form of entertainment, in that such persons find diversion, amusement, or otherwise agreeable occupation in such activity, transcending the mere utilitarian function of acquiring essential or desirable articles. Such activity is especially enjoyed in the context of large shopping venues, such as large, freestanding stores known as "big box" stores, and large department stores offering many diverse types of merchandise and services. Shopping malls or centers in which are situated a plurality of individual stores are venues even more attractive to some. These facilities may comprise one or more large indoor buildings including plural stores with interior access, or a plurality of buildings connected by exterior or interior walkways. Either indoor or outdoor entrances may provide access to individual stores.

Large malls now frequently provide a multitude of different experiences beyond retail sales of goods, including, for example, restaurants, movie theaters, auditoriums, or public spaces for artistic or cultural events. At least one large shopping center even houses an indoor theme park with various amusement rides and the like. Ordinarily, shoppers are free to come and go at a shopping venue without admission charge or control. However, certain entertainment events or other functions or amusements therein may require an admission fee.

It is also to be understood that the activities and events for which the present method is suited, whether or not they involve events having defined programmatic content, typically extend beyond narrowly defined temporal and spatial limits. For example, live entertainment events often occur in a building with defined entrances or an indoor or outdoor area demarcated by fences or other barriers with defined points of entry that may comprise gates, turnstiles, or the like. Many live events take place in a stadium, arena, or auditorium having defined spectator seat locations, e.g. seats uniquely denoted by section, row, and seat numbers or the like. In addition to the actual performance area (such as a playing field or concert stage) and the appointed spectator area, event facilities ordinarily have auxiliary or appurtenant public areas associated therewith. Such areas provide facilities and services that are desirably or essentially associated with the live entertainment event. The auxiliary areas are generally adjacent or in close proximity, and may include non-exclusively: ticket windows; passageways; rest rooms; clubs; restaurants; concession stands selling food and beverages; lounges; overflow areas with audio and/or video links to the principal event area; shops selling souvenirs, promotional merchandise, novelties, or related items; and service facilities such as parking lots and stations for public transportation; and the like. For example, patrons at an athletic event frequently engage in social activity in a venue's parking lot before or after the event, often including the consumption of food and beverage, a practice commonly known as "tailgating." Such activity bears a clear thematic relationship to the athletic event itself, since there is ordinarily extensive conversation about the event, the competing teams or players, or the like. Similar activity is common in connection with concerts and other live spectator events as well.

Similar considerations also apply to shopping activity at a shopping venue. As discussed above, the shopping experience comprehends more than just retail purchase of specific items and the particular spaces devoted thereto. Rather, shopping centers also typically have auxiliary or appurtenant public areas, providing facilities such as restaurants, movie theaters, recreational areas, auditoriums, hotels, or public spaces for artistic or cultural events, as well as parking lots.

It is thus to be understood that the term "venue" as used herein with respect to the activities and events discussed above, whether or not they include specific programmatic content and defined duration, extends to a penumbra defined by its relationship to such activities and events. Participation in the present interactive method may be afforded to persons in the primary area of the activity as well as in any of these penumbral locations, all of which are to be understood as collectively included in the term "venue" as used herein. Such auxiliary areas of a venue as parking lots, lawns, walkways, and the like are to be understood as included as well. It is also to be understood that the present interactive participation may involve activity at any location within the venue.

Figure 2:
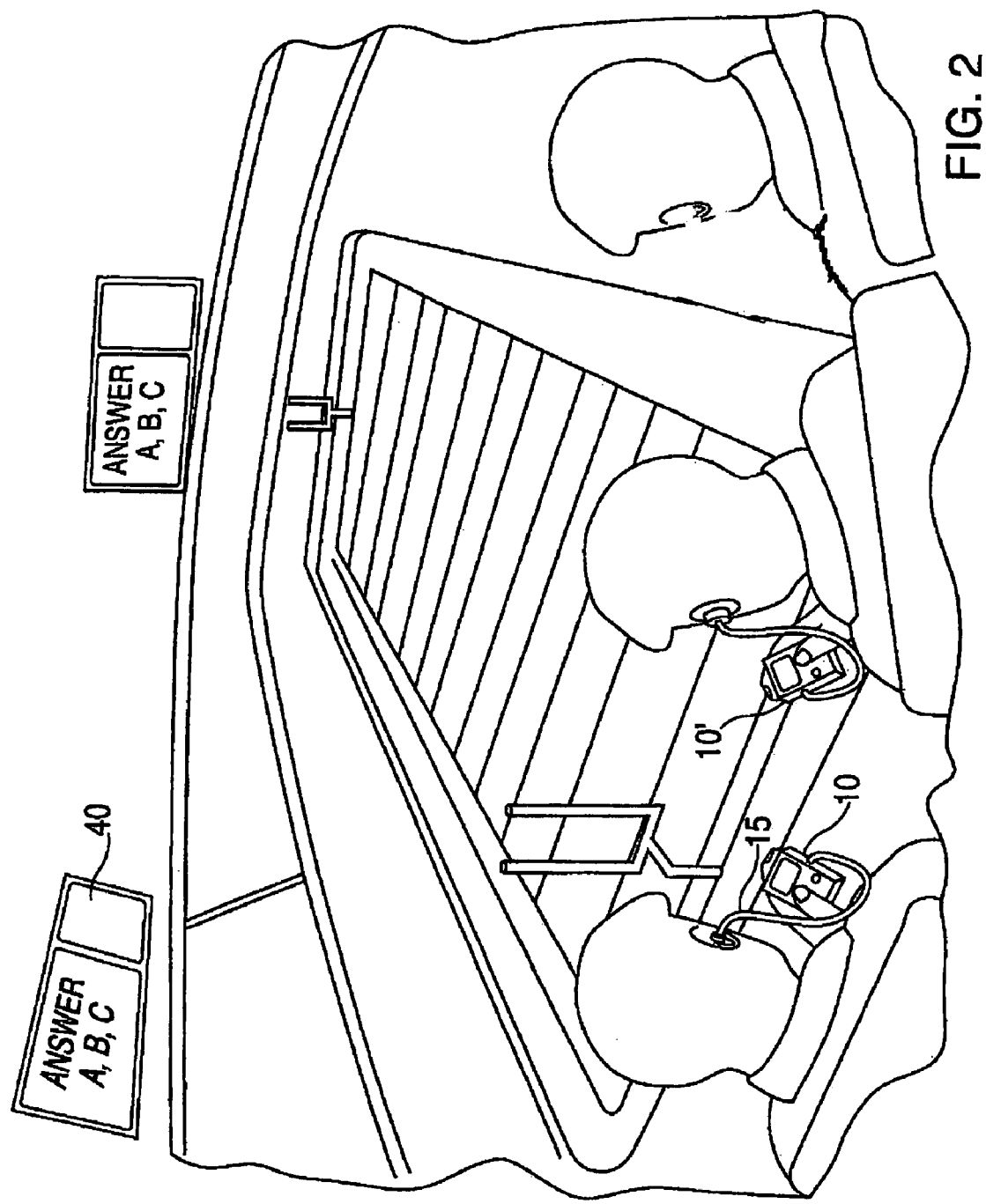
FIG. 2 is a schematic diagram of participants at a spectator event utilizing the interactive participation system of the present invention.

Referring now to FIG. 1, there is shown one form of a hand held, interactive device 10 adapted for use in connection with the interactive participation system of the present invention. In one embodiment, device 10 is employed by audience members at a sporting event as shown in FIG. 2. The device is adapted to communicate bi-directionally with a wireless communications system operative at the event, to provide information to a user, and to accept entry of information through a user input interface for transmission to the wireless communications system. In a preferred embodiment the device 10 includes a housing 12 with an electronic display opening. An electronic display (visual display) 20 providing one form of user output interface is preferably mounted within the housing and is visible through the electronic display opening therein. The electronic display may be of many types, e.g. employing liquid crystal or electroluminescent displays. The electronic display is in electrical communication with a local microprocessor mounted within the housing. A transceiver in electrical communication with the local microprocessor allows for the transmission and receipt of data from a wireless communications system connected to a central processor (not shown) in a manner known in the art. The electronic display is adapted to output information received from the local microprocessor, such as graphic or textual messages that ask the participant to answer a question, provide an opinion, or convey other important information. It is contemplated that data in the form of audio messages could be sent to the user in lieu of or in addition to the visual display. The visual display may be limited to presenting alphanumeric messages, but more preferably is capable of displaying graphical, pictorial, or streaming video input at various scan rates, preferably in real time. Keypad 50 accepts user input for transmission to the central processor.

In another aspect of the invention, the interactive device is optionally used by participants to receive audible or video programming, which may be transmitted in the commercial AM or FM broadcast band or at any of a number of predetermined frequencies in the RF, VHF, UHF, or microwave frequency bands. The transmission may be analog or digital. Programming may also be transmitted optically, such as by modulation of an infrared emitting source located in the venue and received by a complementary photoreceptive element in the wireless interactive device and suitably processed for intelligible output. Optionally, the device also comprises means for receiving and displaying video signals such as from ordinary broadcast television stations. Transmission of such program content may be done via conventional commercial broadcast stations or with low power transmitters intended only to cover the immediate event venue. Transmitters are optionally located either within the venue, in its environs, or in any other location that permits a sufficiently intense signal to be present in the venue. In a preferred embodiment device 10 incorporates circuitry to receive the aforementioned audio or video program content. The circuitry is adapted to receive the content and present it to the user. An earpiece 15 is preferably included to allow the user to listen to the audio content associated with the device without annoying others nearby. It is noted that other listening means could be employed such as earphones, speakers, or the like.

In other embodiments the aforesaid audio or video programming may be transmitted via any computer network to which the interactive device is connected, such as by streaming audio or video transmitted via the Internet, in accordance with presently employed protocols or other suitable protocols.

Such audio or video programming preferably comprises information or program content that is thematically pertinent to the event or venue or provides content otherwise useful to the participants. For example, on a university campus, such material might include news relating to the institution's athletic teams or other cultural or intellectual events in the life of the university community. At a shopping mall, the content might include shopping promotions or announcements or coverage of other entertainment occurring on the premises. The content may include descriptions of the action at the event, related expert commentary or instant replays. The content optionally includes other information of interest to participants, such as news and traffic reports and weather conditions and forecasts. Furthermore, the audio or video programming may include dissemination of questions or other matter incident to contests and polls conducted in accordance with the invention.

It is contemplated that special purpose devices such as the aforementioned interactive device 10 optionally be made available to enable participation by persons who do not carry a conventional wireless device such as a cellular telephone, two-way pager, personal PC, or PDA. Units possessing the required wireless communications capability, electronic display, and user input and output interfaces are easily assembled using off the shelf components, such as transceivers, displays, keypads, and microprocessors, and other miscellaneous electronic components. These special devices would preferably be prepared for each event at one or more locations, having battery charging and menu programming capability, and transported to kiosks or otherwise made available near public entry points in the venue. The kiosks would each be either sales locations or rental contract stations to secure deposit and payment terms (cash, credit/debit card, etc.), for furnishing the special devices to persons desiring to participate prior to start of the event, and collection of rented special devices after conclusion of the individual's participation. Optionally, such a device is provided to at least selected participants without charge or as part of the price of admission or, alternatively, as an optional item rented or purchased by the participant, and preferably subsidized by the promotional messages.

In another aspect of the invention, and more preferably, general-purpose wireless devices such as those routinely possessed and used by members of the public, are used for the aforementioned interactive communication. Preferably the wireless devices are selected from the group consisting of wireless personal digital assistants (PDA) and Pocket PC's; two-way pagers; and cellular telephones. Such devices normally incorporate input means such as keypads, selection buttons, and touch screens, and video and audio output means such as display screens, speakers, and earphones. The devices typically include circuitry, such as a local microprocessor, adapted to convert wireless input into forms presented by the output means and to accept user-entered input that is converted for wireless output in a manner known in the art. Many of these devices are also Internet-enabled, that is to say, able to send and receive textual or graphic data in protocols which are commonly associated with Internet technology and able to be processed suitably by routers, servers, and other ancillary equipment used in Internet communication. Additionally, such devices frequently have the capability of sending and receiving electronic mail and Internet-based instant messages which may be transmitted worldwide over the Internet. Suitable PDA's include wireless units sold under the PALM™ tradename by Palm Computing and under the BLACKBERRY™ tradename by Research in Motion. Wireless Pocket PC's e.g. those sold by Hewlett Packard, Compaq, and Dell, are also suitable.

Known user-supplied wireless interactive devices are ordinarily equipped with either software or hardware features that provide a unique signature or identification of each device, e.g. the telephone number of a cellular telephone or the IP address of an Internet enabled device. The aforementioned special-purpose devices are also provided with unique identification. Both the special-purpose devices and the user-supplied general-purpose devices are adapted to transmit the unique signature for identification purposes.

The present method preferably employs at least one unique signature of each wireless interactive device, whereby a given participant's entries and responses may be individually attributed and tracked and the various interactive features described herein may be individually or collectively implemented. In addition, an electronic account is frequently associated with each user-supplied device for charges and credits. In some of the embodiments of the present invention, charges are levied for goods and services provided and transferred to the account associated with each device. Likewise, monetary credits, coupons, and the like can be disseminated either electronically to the account or by mail to an address associated with the account.

In addition, it is preferred that information establishing each participant's location within a venue also be associated with that user's device. The association can be effected in many ways. Preferably, a given user is provided during the enrollment process with one or more identifying indicia that can be entered using the user input interface of the device and included in the unique signature transmitted by the device. For example, participants may be provided with indicia distributed beforehand or upon a request that is entered through the wireless device, e.g. through wireless connectivity to the Internet. Indicia may be provided by regular mail, e-mail, telephone text messaging, by connecting with an appointed Internet site, or any other suitable means. The foregoing features by which users are individually identifiable also permit the various services offered selectively to qualified, appropriate, or interested participants or groups of participants.

Many of the wireless devices useful in connection with the present system, such as cellular telephones, now include localization circuitry. One form of such circuitry relies on global positioning system (GPS) technology. The device is thereby enabled to determine its geographical position quite accurately and transmit a position identification signal under appropriate circumstances. In an aspect of the invention, the present system includes location-receiving circuitry, such as that provided by a wireless service provider, capable of receiving position identification signals from a wireless device and thereby determining whether a particular wireless device is within a preselected, geographically delimited operational zone. For example, this functionality is optionally used to ascertain whether a given device is on the premises of a venue such as a shopping center, a university campus, or a theme park.

As there are many suitable alternatives on which to base an embodiment of the current invention which are known to those skilled in the art, the specific interactive device and wireless communications technology used, the specific multiple access communication protocol used, and the specific client/server hardware interface and protocol are not important to the method of the invention so long as they support the required functions. What is important is the method of this invention by which the customer is provided better service.

A number of currently used communications protocols suitably provide connectivity between several of the aforementioned user devices and a wireless communications system. One presently preferred protocol is provided by the commercial cellular telephone network. Many wireless or cellular telephones currently operative with these networks incorporate provisions for sending and receiving textual messages and graphic images, and for exchanging electronic mail through the Internet. Improved capabilities for wirelessly transmitting streaming video at various scan rates are rapidly being developed and are useful in the practice of the present method. Current cellular telephone systems provide various forms of instant messaging capability also useful in transmitting and receiving the queries, advertisements, and the like used in the present method. Messaging in accordance with the Short Message Service (SMS) protocol is presently preferred, but other forms of messaging are also contemplated within the present invention.

The bidirectional wireless communications used in the practice of the present method and system are preferably implemented using at least one transmission form selected from the group consisting of radio transmissions, microwave transmissions, broadband wireless data transmissions, and satellite transmissions. Ultra-wide band and spread-spectrum transmission are especially promising technologies for the broadcasting of messages and transmission of participants' responses. The multiplexing and frequency shifting inherently available in such technologies improve immunity to noise and interference and the security of data in transmission. For example, suitable techniques which may be used in the implementation of the present system are practiced in connection with cellular telephone systems, including such currently preferred methods as frequency division multiple access (FDMA), time division multiple access (TDMA), code division multiple access (CDMA), and global system for mobile communications (GSM) protocols, as well as other protocols including those defined by the International Telecommunications Union. Especially preferred are implementations of the present method compliant with interoperability standards promulgated by the Open Mobile Alliance and made available at the website www.openmobile.com and by the WAP Forum at the website www.wapforum.com. It is also preferred that access to the interactive features of the present invention be provided to customers of more than one provider of wireless services, including providers of cellular telephone service or of wireless access for PDAs and Pocket PCs. In some embodiments, such access for participants employing wireless interactive devices served by a plurality of providers is provided by a wireless communications system wherein network connection of plural providers permits needed exchange of information, e.g. via the Internet. In other embodiments, the wireless communication system comprises one or more authorized providers of wireless service. Participants employing wireless interactive devices served by another wireless service provider are furnished an access code, such as a telephone number and optionally further codes, or the like, permitting them to connect to one of said authorized providers, whereby they are enabled to participate in the present method, being afforded access to the various features described herein.

Another preferred communications protocol is specified by the several levels of IEEE Standard No. 802.11, published by the Institute of Electrical and Electronics Engineers, and which are incorporated herein in the entirety by reference thereto. Standards in the IEEE 802.11 class (which are also known commonly as "Wi-Fi") specify a local area network system for wirelessly connecting individual devices such as PDA's and Pocket PC's to a local server through which the devices may communicate wirelessly, e.g. through a local intranet or the global Internet. Other wireless protocols that may be used to establish connectivity are also known, such as the Bluetooth Standard, published by the Bluetooth SIG and available through the website www.bluetooth.com, and incorporated herein in the entirety by reference thereto.

It will be understood by one skilled in the relevant art that different transmission modes and frequencies may be used by the wireless communications system for the transmissions to and from the wireless interactive device and that multiple transmission modes and frequencies may be used to accommodate interactive devices of different types simultaneously operated in the present system.

In one aspect, the present method includes the step of providing a wireless communication system adapted to transmit and receive messages with the wireless interactive devices used by the participants. The wireless system is used to disseminate promotional messages to the participants through the user output interface of the wireless device.

The wireless device employed in the present method preferably presents promotional messages or advertising from sponsors and/or advertisers. Monetary compensation for the presentation of such advertising material is optionally used to defray or underwrite the costs associated with practice of the present invention. Messages can be in the form of indicia 30 located (e.g., physically imprinted) on devices loaned, rented, sold, or otherwise provided to participants. FIG. 1. Additionally, the messages can be visually displayed by the device or can be aurally communicated through the same. The messages can be in the form of preprogrammed or stored aural or visual messages or recordings that are played, e.g. when the device is powered up or down, or at regular or random intervals during usage of the device. Preferably, messages are transmitted by the wireless communication system and presented live during the entertainment event via open band lines. Visual advertising may be presented in discrete segments interspersed with program content or it may be incorporated substantially continuously into the overall image being presented at a given time, such as a banner ad.

In still another aspect of the present method, demographic information or characteristics of the users of wireless interactive devices are gathered and used in various ways. Users may be asked to enter information, such as their age or gender. Alternatively, such information may already be extant and available in databases, such as records of cellular telephone customers. Such information may be used to select which of a plurality of advertisements or queries are most appropriate and likely to be of interest to a given user. The individual addressability of devices such as cellular telephones and wireless PDA's permits individually selected commercials to be presented to particular individuals or groups. Demographic information may also be used to tailor questions and limit contest participation to selected users. For example, in some embodiments participation in all or part of a survey or competition may be offered only to a demographically restricted group. At a casino or other entertainment venue within which entry to certain areas and participation in certain events, e.g. gambling and consumption of alcoholic beverages, is restricted by age, promotional messages may be limited accordingly. In addition, customer survey information is considered more useful by advertisers if the answers are categorized by the demographics of the respondents. All of these functions are easily implemented in the practice of the present method.

In an aspect of the invention, interactive participation using the present method and system is limited to participants who have been enrolled. Such enrollment may be effected by any suitable process carried out either before or during the entertainment event or activity. Optionally, enrollment requires monetary consideration from the person becoming an enrolled participant. Preferably, a participant enrolls by entering suitable information using the wireless interactive device. In some implementations, prospective participants may enroll by a method including a request for enrollment transmitted by telephone, e-mail, interactive registration through an Internet site, regular postal mail, in person at a kiosk or a dedicated terminal provided at the venue. Optionally, the patron is provided with an activation code to be entered using the user input interface of the wireless device. Alternatively, persons having a suitable wireless device with localization circuitry may be identified as being present in the venue and thereafter enrolled automatically or be prompted to accept enrollment, e.g. by exchange of text messages. In other embodiments, participation is limited to persons who have enrolled and who are also identified by wireless device localization circuitry as being physically present at the event venue. Optionally, the participant status is terminated when the individual is no longer present in the venue, but may be restored automatically upon return to the venue. The enrollment may also be for a predetermined time period and expire thereafter. The dissemination of information, such as promotional messages and queries for the interactive contests afforded by the present method, may be limited to participants actually present at the venue.

In yet a further aspect, the present method may be used to conduct contests, games, and opinion polls of many types. Generally stated, such activities comprise the steps of: posing one or more questions to participants; prompting the participants to enter an answer to the question using their wireless interactive devices; and processing the results. The questions may be posed using any communication form by which they can be effectively conveyed to participants. Preferably the questions are in a form that may be answered by selection of one of a relatively limited number of alternatives, such as a multiple-choice question or a rating scale. Answers may be entered using the user input interface. Preferably, the results are reported to at least the participants, but they may also be furnished to sponsors, advertisers, or other interested parties.

Contests, games, and polls may include many different types of questions. Concertgoers might be asked to select a favorite song or artist from a number of choices presented or to choose songs to be performed during the concert. Civic events and political rallies might evoke questions about preferences of candidates for public office, opinions about civic issues, legislation, and public policies of many sorts. Participants may also be asked various market research questions, such as their rating of goods or services, e.g. for quality, popularity, ease of use, or other desired characteristics. Other types of questions of more general nature and interest may also be used. Answers preferably are accepted during a limited, preselected time interval.

Preferably, participants in the contests, games, or polls, or respondents to other queries conducted in accordance with the invention, are awarded prizes or other forms of consideration as inducement to participate. For example, one or more participants who correctly answer contest questions or participate in games or opinion polls may be awarded a cash prize or credit. These considerations may be utilized to enhance the enjoyment of participants, to encourage further participation in the querying and contest aspects of the present method, and to promote the sale of goods and services. Such prizes include goods and services of any form or discounts toward the purchase thereof. One preferred form for the delivery of such a credit is an electronic coupon that can be redeemed for any form of consideration, including merchandise, services, and/or other prizes available at the venue. Alternatively, coupons redeemable for items or services at no cost or at a reduced cost may be delivered. For example, a message may be transmitted to a user's wireless device bearing a unique authentication code that could be verified by a vendor, such as through a cash register electronically linked to the central processor or order processing server, or by a telephone call to a preselected verification number. In other implementations, a graphic image such as a bar code or other like pattern indicative of the coupon is delivered for display on the user's wireless device and read by a suitable reader at a cash register. In still another alternative, a printed coupon can be physically delivered to the participant based on the location of the user's interactive device by means of communication with the transceiver located therein or by other indication means, or delivered to a remote location by actual physical delivery by mail or the like, or by any form of electronic delivery. Either points or direct monetary credits could also be entered electronically into an account associated with a user, such as a user's credit or debit card, an account for the user's wireless device or Internet service provider, or by other like means known in ordinary commerce. For example, a user collecting sufficient points may redeem them for goods, services, or money. In a preferred embodiment, credits or coupons are transmitted to the winning participant in conjunction with billings for such an account of the participant.

Implementations of the present method and system particularly suited for shopping malls and related types of venue preferably include dissemination of promotional messages soliciting participants to patronize businesses within the venue. Preferably, the promotional messages also convey coupons or other discount offers.

Certain businesses such as restaurants, hairdressers, spas, physical exercise facilities, and the like, are commonly located in shopping malls. These businesses offer particular and specific services to individuals or small, predefined groups of acquainted persons, either at appointed times or when service (i.e. specific equipment or service persons) becomes available. Practice of the present method is especially beneficial for these enterprises. In an aspect of the present method, promotional messages from these businesses solicit enrolled persons to make a reservation for a desired future service and request notification to be made thereafter through the wireless interactive device, such as by receipt of a cellular telephone call or text message, of the availability of the service. For example, a restaurant might notify a patron that a table has become available; a gymnasium might notify a patron that desired exercise machines or a personal trainer was available. The service may also comprise a defined service task, such as repair of shoes or other wearing apparel, an appliance, or a motor vehicle, with the notification of the patron indicating completion of the service task and the availability of the item for pick-up. In these and related situations, customers are afforded a more pleasant shopping experience and a more productive use of time enjoying other activities or accomplishing other needful tasks instead of non-productively waiting in lines.

In a further embodiment, the solicitation and querying for services is optionally used also for ordering. For example, a restaurant might solicit business by providing its food and beverage menu by transmission to the participant's wireless interactive device. A hierarchical arrangement of a known sort including submenus may be used in situations wherein more items are available than can be accommodated within the confines of output displays of extant interactive devices. An interested user could then select desired items by navigating using the input interface through the menus to select and order one or more items for purchase, either to be consumed at the restaurant or prepared for take-out. The user is notified when the order is ready or a table is available using his/her wireless interactive device. As hierarchical menu systems have become ubiquitous with the advent of automated teller machines and windowed graphical user interfaces on modern personal computer operating systems, the concept and the method of their use are familiar to many persons and will not be further described here.

Preferably, monetary consideration for purchased items is provided by electronic transfer of funds between bank accounts or by charges billed to a user, such as to a user's conventional debit or credit card or wireless service provider account. Consummation of transactions using other forms of payment known for electronic processing may also be used and are to be considered within the scope of the method of the invention. In one embodiment, the present system is connected to an electronic financial network of a type known in the art. Transfer of funds from the network provides monetary consideration to the provider for the goods and services received by the ordering participant.

Alternatively, any mechanism for effecting electronic payment known in the relevant art is used. As is well understood by those skilled in the art, even the limited hardware display and processing capacity of present cellular telephones, PDA's, and pagers is sufficient to accommodate the aforementioned menu and ordering method. However, as time moves on, much higher text densities and graphics resolution will likely become commonplace in such devices and allow ever-increasing functionality to be provided and used in the method of this invention.

In addition, other services are optionally offered, such as restaurant, lodging and transportation reservations, biographical and recording data for athletes, concert artists, and other performers, future schedules of events, and myriad other information. This information can be conveyed visually, audibly, or via a combination of both media forms. The offerings presented through the wireless interactive device may be complemented by messages simultaneously displayed on video displays, monitors, or the like to enhance their ability to garner the participants' attention.

In an implementation, the present method also comprises querying the participants to respond with answers entered through the user input interface of the wireless device and transmitted therefrom using the wireless communication system. The answers received are transferred to a central processor for processing into results. It will be recognized that the accumulation of results may be done in the central processor or in one or more distributed receiving servers networked in data communication with the central processor by techniques well known in the computer art, such as by use of a local area network communicating over wire, wireless, or fiber optic communication links. Preferably, a stored computer program operative in either form of server accumulates and stores the incoming answers, at least temporarily, as participant data. The results of processing the participant data are also preferably stored, at least temporarily. At a suitable time, such as after the expiration of an announced deadline for participants to enter and transmit their responses to queries, the processed results are then announced to the participants. Optionally prizes are awarded to participants who have entered an answer.

It will be understood that all of the aforementioned computing functions can be carried out by one or more general-purpose computer processors located either within the event venue or its environs, or at a remote location linked by any suitable data communications link using cable, fiber-optic, wireless, or other comparable transmission. The computing functions may be carried out by a single central processor, by linked distributed processors, or a combination thereof.

Queries can be promulgated to the participants in many ways, including notice given by public address system announcements, visual displays such as video monitors of any size, or the like visible to the participants, or by messages such as aural, textual, or graphic messages transmitted to the interactive units and then output to the participant using the user output interface. In some implementations questions may be printed in event programs, flyers, newspapers, or the like. Optionally the queries are included in content provided by Internet portal sites to which participants may connect. Questions may also be included in audio or video announcements, or in other program content broadcast to the interactive units. Preferably, the questions are promulgated using at least one display visible to the participants. More preferably, the visible display comprises large-scale displays and/or monitors provided in the venue. After assimilation and processing of participant responses, announcement of results may be given to the participants by similar means, or by another form of public dissemination, such as an Internet posting.

In one embodiment, a display visible to a sizable number of participants, such as large screen display 40, as depicted in FIG. 2, is used both for promulgating queries to participants and for announcing results. Any one or more large display devices capable of displaying a video, graphic, or alphanumeric image to a large number of participants may be used, a JUMBOTRON® display being one suitable and preferred type. Alternatively, the display visible to the participants comprises plural video monitors such as CRT displays, plasma screens, or the like, preferably dispersed throughout the venue.

The questions and results are optionally displayed on these monitors. A user input interface, such as keypad 50 on device 10, allows an enrolled participant to enter a response to queries. Examples of simple user input interfaces include a keypad, selection buttons, a touch screen, a rotatable dial, a pointing device such as a mouse or trackball, and a voice recognition system, but any other user interface by which the required input can be effected could be incorporated in the practice of the invention. A voice recognition system advantageously facilitates the use of the present system by visually impaired persons. Many easy to use interfaces are known to one of ordinary skill in the art, and the invention is not limited to any particular user interface.

In FIG. 2 there is depicted the practice of an embodiment of the invention. At least some of the spectators at an athletic event occurring in a large, outdoor stadium employ an interactive device 10 and 10'. Although FIG. 2 depicts the practice of the present method in a football stadium, it will be understood that the present invention may also be practiced at venues of other types. It will be understood that the interactive device may be an item provided by the participant such as a cellular phone, or a wireless PDA or Pocket PC. Alternatively, suitable general- or special-purpose devices are made available at the spectator venue for purchase or rent or are given away without charge. In still other embodiments, the present system is operative both with user-provided devices and devices made available at the venue. The present inventor contemplates that only a portion of the persons present in a venue may choose to participate, either by using a suitable general-purpose interactive device they furnish or by obtaining a specialized unit at the venue. FIG. 2 further depicts the users entering answers to a query using keypads available on their respective interactive devices and the display of answers on a large display board 40. In addition to displaying results of the audience querying or contest, the material displayed on board 40 or dispersed video monitors optionally also includes promotional messages or advertising. For example, a given contest question might be sponsored by a business entity in return for including advertising for the entity's products or services during the querying and announcing associated with that contest.

Optionally, the responses of the participants are sent to a central processor (not shown) having a computer program stored and operative therein that is adapted to tabulate the responses. Then, the processed information is stored and displayed to the audience member, either on the device 10 or a remotely located large screen display 40. FIGS. 1 and 2. The processed information could be a compilation or tabulation of similar responses, as either a number or a percentage of total responses, a graphical representation in a bar chart, pie chart or the like, or a combined graphical and numerical representation of the data. The processing further may include categorization of participants' responses according to demographic characteristics, which might include the age or gender of the participant.

In addition to prizes that can be won by participating in the contests and polls described above, a number of other incentives are optionally offered to attendees to induce them to participate in the interactive aspects of the present invention. In one aspect, access to a chat room and instant messaging are provided to some or all the enrolled participants. Participants may be enrolled by any suitable process, as delineated hereinabove. Messages may be exchanged interactively among the participants using any suitable protocol, such as cellular telephone text messaging and known systems used for instant messaging between Internet enabled personal computers and Internet-enabled wireless telephones, PCs, and PDAs. Optionally, enrolled participants are offered the chance to receive one or more newsworthy instant messages from a message sponsor. In some embodiments, the chat room and instant message features are provided at no cost, while in others, a fee might be charged by the offering entity for the services.

Yet another aspect of the invention allows participants to interactively participate in auctions, which may be of any type commonly known, including conventional auctions wherein items are sold to the lowest bidder; Dutch auctions, in which one or more items are offered at a fixed price to the first bidder or preselected maximum number of bidders; a reverse auction, in which the price of an item is lowered in response to a large number of bids received; and other forms. The goods or services offered in such auctions may include any goods or services of interest to the participants. The auctions are conducted by disseminating a description of the goods or services offered to the participants through one or more of the modes discussed hereinabove for the dissemination of the contest queries of the invention. Participants enter their bids or related responses by using the user input interface of their wireless interactive devices. Such auctions conducted within a venue in accordance with the invention beneficially evoke a high level of interest due to the level of enthusiasm and excitement typically evident in such an environment.

Preferably, the opportunity to participate in the various interactive features of the present method and system, along with eligibility for the various prizes and other incentives, are offered to substantially all the persons at the venue. However, participation in some or all features may be limited to some subset of the persons physically present at the event.

Figure 3:
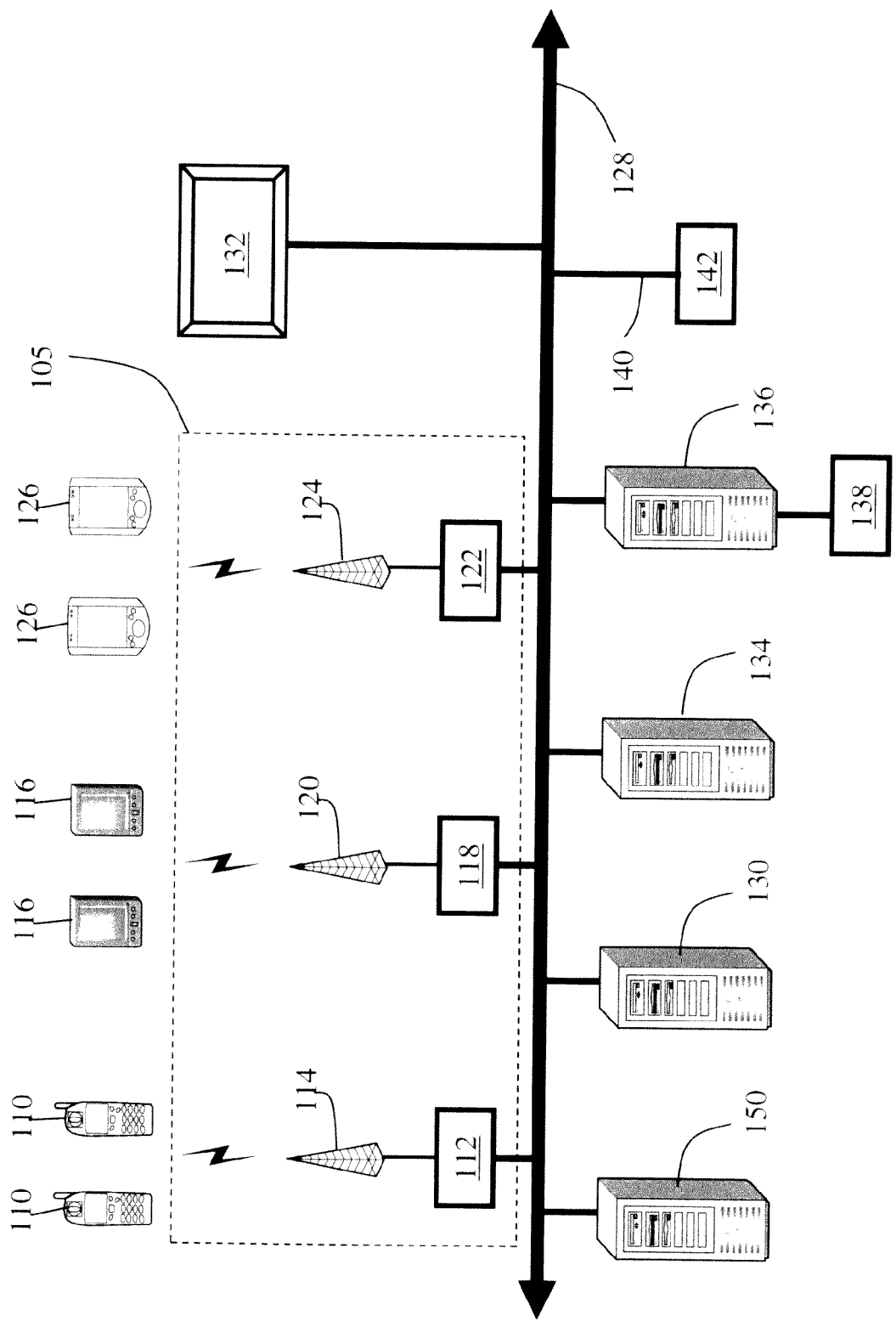
FIG. 3 is a schematic diagram of a system of the invention for enhancing participant enjoyment and interaction.

FIG. 3 depicts one implementation of the system 100 of the invention. A wireless communications system 105 provides service to cellular telephones, wireless PDA's, and Pocket PC's. Wireless interactive devices used with the system are a plurality of cellular telephones 110 and served by cellular telephone provider 112 through signals transmitted and received at antenna 114. Wireless PDA's 116 are served by wireless PDA service provider 118 through signals transmitted and received at antenna 120. A wireless local area network 122 transmitting signals in accordance with one of the levels of IEEE Standard 802.11 from antenna 124 serves wireless Pocket PC's 126. Each of cellular telephone provider 112, wireless PDA service provider 118, and wireless local area network 122 communicates through the Internet 128.

Enrollment server 150 is used to receive messages transmitted from interactive devices 110, 116, and 126 or otherwise requesting enrollment. Promotional message server 130 selects promotional messages which are transmitted via the Internet to wireless communications system 105. and broadcast to interactive devices 110, 116, and 126. Promotional messages are also transmitted to a large video display 132, which includes a controller operative to receive digital information, e.g. information received via the Internet, and convert it into corresponding textual, graphic, or video displays for presentation. Central processor 134 provides queries displayed on display 132. Answers to such queries are entered on the user input interfaces of interactive devices 110, 116, and 126 and received by distributed receiving servers (not shown) maintained by each of cellular telephone provider 112, wireless PDA service provider 118, and wireless local area network 122. The distributed receiving servers accumulate the answers and transfer them by Internet to central processor 134 for processing into results, which are then communicated and displayed by display 132. Order processing server 136 receives orders for goods and services entered by participants using their wireless interactive devices and communicates those orders to one or more providers 138 of goods and services, such as food/beverage vendors. Connection 140 to electronic financial network 142 enables the electronic transmission to providers 138 of monetary consideration for the goods and services they furnish. Enrollment server 140 acts in concert with central processor 134 and promotional message server 130 in the selection of promotional messages and queries and the enrolled participants to whom such communications are sent.

It will be understood by those skilled in the relevant art that the functions of the plural servers alternatively may be shared among a smaller number of servers or may be accomplished by central processor 134. The plural servers also may be in data communications via the Internet or a local network implemented using connections by wire, wireless, or optical data transmission, in any way conventional in the art. Other networking protocols suitable for the interchange of digital information may also be used.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A method for enabling interactive participation by enrolled participants during shopping activity occurring at a shopping venue patronized by a plurality of persons, said enrolled participants employing a wireless interactive device having a unique signature associated therewith and capability to: (i) receive and transmit messages; (ii) accept input via a user input interface; (iii) output messages to a user output interface; and (iv) transmit said unique signature, the method comprising the steps of:

enrolling at least some of said persons as enrolled participants, each being equipped with one of said wireless interactive devices;

providing a wireless communication system for transmitting and receiving messages with said interactive device;

querying said enrolled participants to respond to at least one query with an answer entered through said user input interface and transmitted by said interactive device; and receiving answers entered by said enrolled participants, said wireless interactive device further comprising localization circuitry for transmitting a location signal indicative of a physical location of said device, said method further comprising the step of detecting said transmitted location signal and said querying being directed only to enrolled participants for whom said transmitted location signal is indicative of a physical location within said shopping venue.

2. A method as recited by claim 1, further comprising the step of disseminating at least one promotional message to said enrolled participants.

3. A method as recited by claim 2, wherein said promotional message is displayed on said user output interface.

4. A method as recited by claim 2, wherein said promotional message is disseminated for monetary consideration from an advertiser.

5. A method as recited by claim 2, wherein said promotional messages include: (i) a solicitation for enrolled persons to make a reservation for provision at a future time of a desired service; and (ii) a notification thereafter of the availability of said desired service.

6. A method as recited by claim 5, wherein said solicitation prompts said enrolled person to select and order items comprised in said desired service.

7. A method as recited by claim 1, wherein said enrolling step is effected automatically for persons patronizing said shopping venue and possessing a said wireless interactive device, upon detection of said transmitted location signal indicative of a physical location within said shopping venue.

8. A method as recited by claim 1, wherein said enrolling comprises receipt of a request transmitted by one or more of said persons requesting enrollment as participants.

9. A method as recited by claim 8, wherein said transmitting of said request is carried out using at least one of telephone, e-mail, interactive registration through an Internet site, and regular postal mail.

10. A method as recited by claim 1, further comprising the step of providing at least one kiosk or terminal at said shopping venue, said kiosk or terminal accepting requests for enrollment of said persons as said enrolled participants.

11. A method as recited by claim 8, wherein said enrolling comprises receipt of a text message transmitted from said wireless interactive device.

12. A method as recited by claim 1, wherein said enrolling further comprises receipt of an activation code entered using said user input interface of said wireless interactive device.

13. A method as recited by claim 1, wherein said enrolling is terminated upon the departure of said participant from said shopping venue.

14. A method as recited by claim 1, wherein said enrolling expires after a predetermined time period.

15. A method as recited by claim 1, wherein said unique signature comprises indicia entered into said wireless interactive devices using the user input interface thereof.

16. A method as recited by claim 1, further comprising collecting demographic characteristics of at least a portion of said enrolled participants.

17. A method as recited by claim 16, wherein said query is selected based on said demographic characteristics of said enrolled participant.

18. A method as recited by claim 16, further comprising the step of disseminating at least one promotional message to said enrolled participants, said promotional message being selected based on said demographic characteristics of said enrolled participant.

19. A method as recited by claim 1, further comprising the step of offering at least one incentive to induce said persons to become said enrolled participants during said shopping activity.

20. A method as recited by claim 19, wherein said incentive comprises conveying to said participant at least one of goods, services, or coupons redeemable for at least part of the price of goods or services.

21. A method as recited by claim 19, wherein said incentive comprises electronic transfer of consideration to said enrolled participant.

22. A method as recited by claim 1, further comprising the step of relaying informational items, said items being transmitted by said wireless communication system to said wireless interactive device for output using said user output interface.

23. A method as recited by claim 22, wherein said informational items comprise items selected from the group consisting of news reports, traffic condition reports, weather conditions, weather forecasts, sports news and scores, 24. A method as recited by claim 1, wherein said querying comprises a contest.

25. A method as recited by claim 1, wherein said querying comprises a game.

26. A method as recited by claim 1, wherein said querying comprises an opinion poll.

27. A method as recited by claim 1, wherein said querying is limited to a portion of said enrolled participants.

28. A method as recited by claim 1, wherein said querying step is accomplished by at least one display visible to said participants.

29. A method as recited by claim 28, wherein said display comprises a large-scale video display.

30. A method as recited by claim 1, wherein said querying step is accomplished by a notice audible to said enrolled participants.

31. A method as recited by claim 1, further comprising the step of awarding a prize to at least one of said participants who has entered an answer in response to said querying.

32. A method as recited by claim 31, wherein said prize is delivered to said enrolled participant.

33. A method as recited by claim 31, wherein said prize is transferred electronically to said enrolled participant.

34. A method as recited by claim 1, wherein said wireless communications system transmits and receives using at least one transmission form selected from the group consisting of radio transmission, microwave transmission, broadband wireless data transmission, ultra-wide band transmission, spread-spectrum transmission, and satellite transmission.

35. A method as recited by claim 1, wherein said interactive device is a member selected from the group consisting of cellular telephones, two-way pagers, wireless personal digital assistants, and wireless pocket PC's.

36. A method as recited by claim 1, wherein said wireless interactive device is Internet-enabled and at least a portion of the communications to and from said wireless interactive device is accomplished using the Internet.

37. A method as recited by claim 1, wherein said user output interface comprises at least one of an alphanumeric text display, a graphical display, and an audio output means.

38. A method as recited by claim 1, wherein said shopping activity comprises at least one event having programmatic content with an identifiable duration.

39. A system for enabling interactive participation by enrolled participants during shopping activity occurring at a shopping venue patronized by a plurality of persons, each of the participants employing a wireless interactive device having a unique signature associated therewith and capability to: (i) receive and transmit messages; (ii) accept input via a user input interface; (iii) output messages to a user output interface; and (iv) transmit said unique signature, the system comprising:
  means for enrolling at least some of said persons as enrolled participants, each being equipped with one of said wireless interactive devices;
  a wireless communication means for transmitting and receiving messages with said interactive device;
  means for querying said enrolled participants to respond to at least one query with an answer entered through said user input interface and transmitted by said interactive device;
  means for receiving answers entered by said enrolled participants, and
  means for disseminating at least one promotional message to said enrolled participants through said user output interface of said interactive device
  said disseminating means comprising a promotional message server in data communication with said wireless communications system, said promotional message server providing said at least one promotional message from a plurality of messages stored in said promotional message server and sending said promotional message to said wireless interactive device through said wireless communications system.

40. A system as recited by claim 39, wherein said wireless communications means comprises at least one wireless system operated by a wireless service provider.

41. A system as recited by claim 39, wherein said query is displayed on said user output interface.

42. A system as recited by claim 39, wherein said querying means comprises at least one display visible to said enrolled participants and said query is displayed thereon.

43. A system as recited by claim 42, wherein said visible display comprises a plurality of video monitors dispersed throughout said venue.

44. A system as recited by claim 42, wherein said visible display comprises a large screen display visible to the enrolled participants in said venue.

45. A system as recited by claim 39, wherein said promotional message server employs demographic characteristics of said enrolled participant in selecting said promotional message for said enrolled participant.

46. A system as recited by claim 39, further comprising at least one prize appointed to be awarded to at least one of said enrolled participants.

47. A system as recited by claim 39, wherein said wireless interactive device is a member selected from the group consisting of cellular telephones, wireless personal digital assistants, wireless pocket PC's, and two-way pagers, said member being provided wireless access by said wireless service provider.

48. A system as recited by claim 39, wherein said wireless interactive device is Internet enabled and communicates therewith.

49. A system as recited by claim 39, wherein said wireless interactive device incorporates circuitry for receiving broadcast informational items and said system further comprises a broadcasting system broadcasting said informational items appointed to be received by said wireless interactive device.

50. A system as recited by claim 39, wherein said wireless communications system transmits and receives using at least one transmission form selected from the group consisting of radio transmission, microwave transmission, broadband wireless data transmission, ultra-wide band transmission, spread-spectrum transmission, and satellite transmission.

51. A system as recited by claim 39, wherein said querying means comprises a querying server in data communication with said wireless communications system, said querying server providing said at least one query from a plurality of queries stored in said querying server and sending said query to said enrolled participant's said wireless interactive device through said wireless communications system, said querying server employing demographic characteristics of said enrolled participant in selecting said query.

52. A system as recited by claim 39, wherein said wireless interactive device further comprises localization circuitry and transmits its position obtained from said localization circuitry.

53. A system as recited by claim 39, wherein said enrolling means comprises an enrollment server in data communication with said wireless communications system and said querying means, said enrollment server receiving and consummating requests for enrollment as enrolled participants transmitted by one or more of said persons and communicating said enrollments to said querying means.

54. As system as recited by claim 53, said enrolling means further comprising at least one kiosk or terminal in said shopping venue for receiving said requests for enrollment.

* * * * *